(12) United States Patent
Holland et al.

(10) Patent No.: US 8,769,814 B2
(45) Date of Patent: Jul. 8, 2014

(54) DEVICE AND METHOD FOR REPAIRING A FORWARD FRAME V-BLADE IN AN AIRCRAFT ENGINE

(75) Inventors: Brian Kenneth Holland, Lansing, MI (US); Michael J. Madel, Colchester, CT (US); William Bogue, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 786 days.

(21) Appl. No.: 12/828,836

(22) Filed: Jul. 1, 2010

(65) Prior Publication Data

US 2011/0000086 A1 Jan. 6, 2011

Related U.S. Application Data

(60) Provisional application No. 61/270,335, filed on Jul. 6, 2009.

(51) Int. Cl.
*B23P 6/00* (2006.01)
(52) U.S. Cl.
USPC ........ 29/889.1; 29/889; 29/889.2; 29/889.21; 29/402.03; 416/198 A

(58) Field of Classification Search
USPC ............ 29/889, 889.1, 889.2, 889.21, 401.1, 29/402.03, 464; 416/198 A
See application file for complete search history.

(56) References Cited

U.S. PATENT DOCUMENTS

| 4,517,038 | A | 5/1985 | Miller |
| 5,023,987 | A | 6/1991 | Wuepper et al. |
| 7,210,909 | B2 * | 5/2007 | Escure et .................. 416/198 A |
| 2009/0258185 | A1 | 10/2009 | Holland et al. |

* cited by examiner

*Primary Examiner* — Richard Chang
(74) *Attorney, Agent, or Firm* — Miller, Matthias & Hull LLP

(57) ABSTRACT

A repair device and method for repairing a forward frame v-blade on an aircraft engine are described in which the repair device replaces a section of the forward frame v-blade. In one embodiment, the repair device includes a supplemental part, which is secured to the forward frame v-blade. The supplemental part includes a central web and a pair of legs with a leg thickness that is greater than the thickness of corresponding flanges on the forward frame v-blade. Fasteners such as rivets are used to couple the supplemental part to the forward frame v-blade.

7 Claims, 7 Drawing Sheets

DEVICE AND METHOD FOR REPAIRING A FORWARD FRAME V-BLADE IN AN AIRCRAFT ENGINE

CROSS-REFERENCE TO RELATED APPLICATIONS

This application claims the benefit of priority under 35 U.S.C. §119(e) from U.S. Provisional Patent Application Ser. No. 61/270,335, entitled "V-blade Crack Repair Method" and filed on Jul. 6, 2009. The content of this application is incorporated herein by reference in its entirety.

TECHNICAL FIELD

The present invention relates generally to aircraft and aircraft engines, and more particularly, to a device and a method of implementing the device to repair a forward frame v-blade located in the nacelle of the aircraft engine

BACKGROUND

Components of aircraft engines may develop cracks and other formations that degrade performance of the component and/or cause other more catastrophic failures in the engine. Cracks may form in certain components that must be replaced in their entirety. However, because of the scale, size, complexity, and cost, replacement of such components is fundamentally undesirable. A more advantageous solution would therefore be to repair these components while still in place, thus avoiding costly maintenance and repair.

SUMMARY

There is described below embodiments of a device and method for repairing components of gas turbine engines without having to remove the damaged component. The proposed repair includes a supplemental part that is configured with features to improve the mechanical properties of the damaged component in its repaired condition. Such features include, for example, one or more selected dimensions that, while being different than corresponding dimensions of the damaged component, fit within the envelope defined by the damaged component to permit continued operation of the component in its repaired condition.

Further discussion of these and other features is provided below in connection with one or more embodiments, examples of which appear immediately below:

In one embodiment, a repair device for a forward frame v-blade in a gas turbine engine on an aircraft, the forward frame v-blade including a v-blade cross-section with an upper v-blade flange and a lower v-blade flange. The repair device comprises a repair part including a repair part web and a pair of stiffening legs extending from the repair part web in manner forming a channel. The repair device also comprises a splice plate disposed in the channel, the spice plate including a splice plate body having a stepped region for engaging the repair part and the forward frame v-blade. The repair device further comprises an array of fasteners coupling the repair part and the splice plate. The repair device further described wherein the stepped region delineates between a repair part engagement area and a v-blade engagement area, wherein the repair part is coupled to the repair part engagement area, and wherein the stiffening legs have a leg thickness that is greater than the thickness of upper v-blade flange and the lower v-blade flange.

In another embodiment, in a gas turbine engine for an aircraft, a forward frame v-blade comprises a circumferential shape disposed about the gas turbine engine, the circumferential shape having a v-blade cross-section with an upper v-blade flange, a lower v-blade flange, and a v-blade web extending therebetween. The forward frame v-blade also comprises a splice plate coupled to the circumferential shape, the splice plate including a splice plate body having a repair part engagement area and a repair part coupled to the repair part engagement area. The forward frame v-blade further comprises an array of fasteners extending through the repair part, the splice plate, and the circumferential shape. The forward frame v-blade further described wherein the repair part includes a pair of stiffening legs that have a leg thickness that is greater than the thickness of upper v-blade flange and the lower v-blade flange.

In yet another embodiment, a method for repairing an aircraft engine including a nacelle in which is disposed one or more thrust reversers and a forward frame v-blade subject to damage from the thrust reversers. The method comprises one or more steps for exposing a repair section of the forward frame v-blade, removing a portion of the repair section forming an exposed end of the forward frame v-blade, and coupling a splice plate proximate the exposed end. The method further described wherein a repair part is coupled to the splice plate, wherein an array of fasteners is used to couple the splice plate to the forward frame v-blade and to the repair part, and wherein the repair part includes a repair part web and a pair of stiffening legs which in combination with the splice plate and the fasteners causes a bending stress that does not exceed the bending stress for the forward frame v-blade as measured at the repair part web.

BRIEF DESCRIPTION OF THE DRAWINGS

So that the manner in which the above recited concepts of the present disclosure may be understood in detail, a more particular description is provided by reference to the embodiments, which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

Concepts of the present disclosure are useful to repair components of gas turbine engines. These components are typically subject to loading that can cause cracking of the component structure. Because this cracking weakens the component, repair is required to prevent further damage. Instead of removing and replacing the damaged component in its entirety, however, there is provided in the discussion below embodiments of a repair device, and methods for implementation thereof, that can be used to repair the damaged component substantially in place in the nacelle. This feature is beneficial because it can substantially reduce costs associated with repair (e.g., labor and material costs), as well as to provide a repaired structure that may be mechanically and functionally superior to the original component before the damage occurred.

Figure 1:
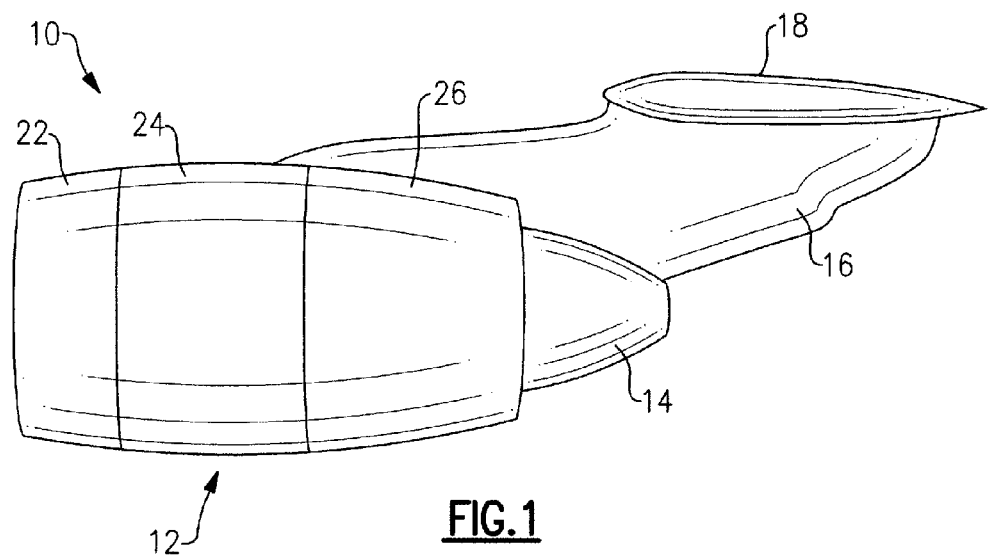
FIG. 1 is a schematic of a nacelle of a gas turbine engine attached to a pylori of an aircraft and including a thrust reverser.
Figure 2:
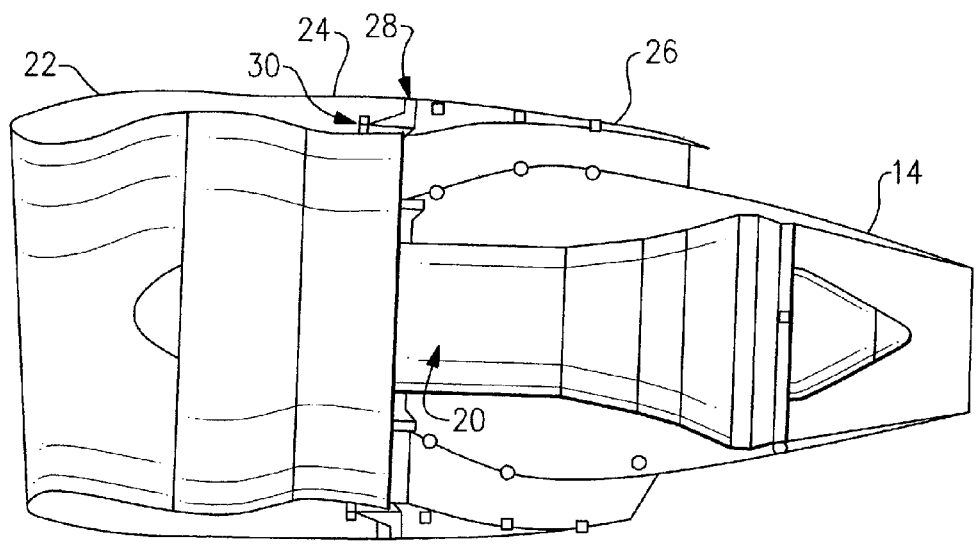
FIG. 2 is a side, partial cross-section, schematic of the nacelle of FIG. 1 that illustrates a torque box and a forward frame v-blade arranged about a gas turbine engine.

With reference now to FIGS. 1-4, repairs of the type contemplated herein can be implemented in aircraft and more particularly in connection with the components of aircraft engines. For example, there is depicted in FIGS. 1 and 2 a schematic of an aircraft 10 that includes a nacelle 12, an exhaust nozzle 14, a pylori 16, and a wing 18. The nacelle 12 functions as an outer casing for a gas turbine engine 20, this casing being formed of an inlet cowl 22, a fan cowl 24, and a thrust reverser 26. Inside of the nacelle 12 there is found a torque box 28 that has a forward frame v-blade 30.

Figure 3:
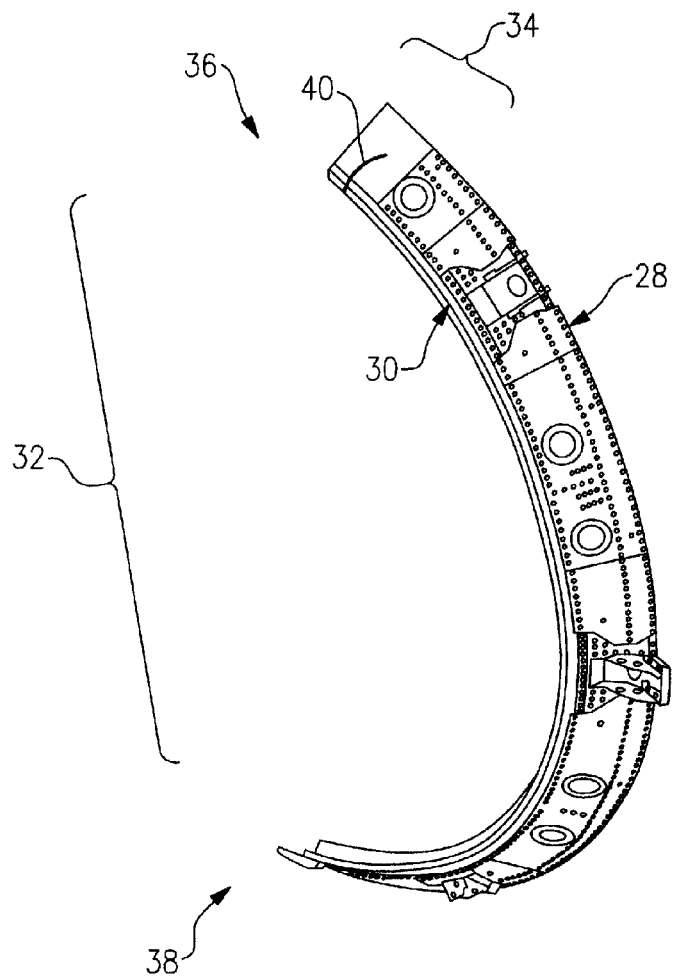
FIG. 3 is a perspective view of the torque box of FIG. 2.
Figure 4:
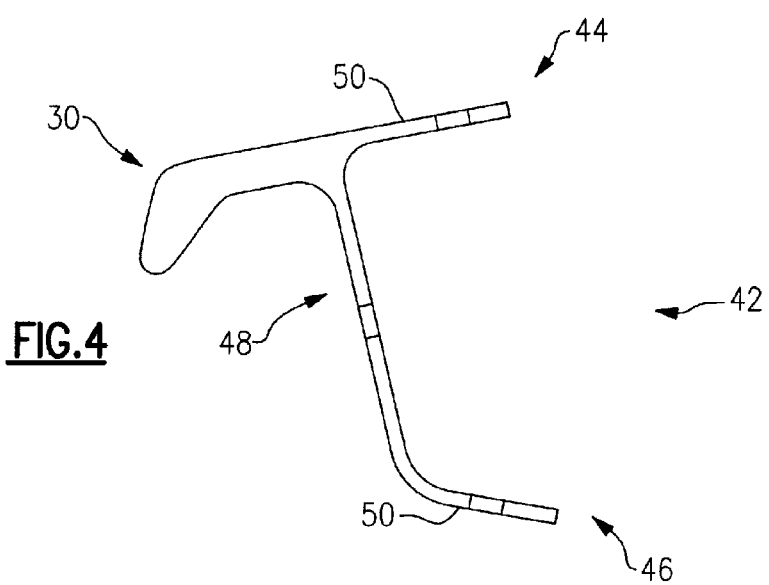
FIG. 4 is a end view of the forward frame v-blade of the torque box of FIG. 3.

As best illustrated in FIGS. 3 and 4, the forward frame v-blade 30 has a circumferential body 32, which typically extends about 180° around the gas turbine engine 20. The circumferential body 32 terminates in a repair section 34, which can be located throughout the circumferential body 32. These locations include, but are not limited to, locations at the extremities of the forward frame v-blade 30 such as a twelve-o'clock location 36 and a six-o'clock location 38. Of course the concepts herein are likewise applicable, however, to other locations of the repair section 34 as based for example on the type of aircraft 10 and/or gas turbine engine 20. The repair section 34 may be susceptible to crack formation 40 such as stress-related cracking possibly caused by misalignment and related assembly defects in the components of the forward frame v-blade 30. Crack formation 40 may propagate by further operation of the thrust reverser 26.

Referring specifically to FIG. 4, the forward frame v-blade 30 has a v-blade channel 42 formed by an upper v-blade flange 44, a lower v-blade flange 46, and a v-blade web 48 extending therebetween. The upper v-blade flange 44 and the lower v-blade flange 46 each have an outer surface 50, which in one implementation forms the outer boundaries for the repair device contemplated herein. In one example, while the repair device fits within these outer boundaries, thus permitting operation of the forward frame v-blade 30 in its repaired condition, the repair device is also configured with improved mechanical properties so as to resist crack formation 40 when installed on the forward frame v-blade 30.

As a relatively high level example, to repair the crack formation 40 in the repair section 34, the repair device comprises a supplemental part that is coupled to the v-blade channel 42. The supplemental part may be single component, or in other examples a bifurcated design is utilized in which the supplemental part may include a plurality of pieces such as a repair part and a splice plate. When used in combination, the repair part and the splice plate replace the repair section 34 in which the crack formation 40 has formed. The supplemental part has features that in one example are similar to those features of the forward frame v-blade 30. These features permit functioning of the forward frame v-blade 30 as was possible before degradation of the forward frame v-blade 30. To further facilitate this functionality, the splice plate couples the repair part to the forward frame v-blade 30 proximate the repair section 34 in a manner that maintains or improves the structural integrity of the forward frame v-blade 30.

Figure 5:
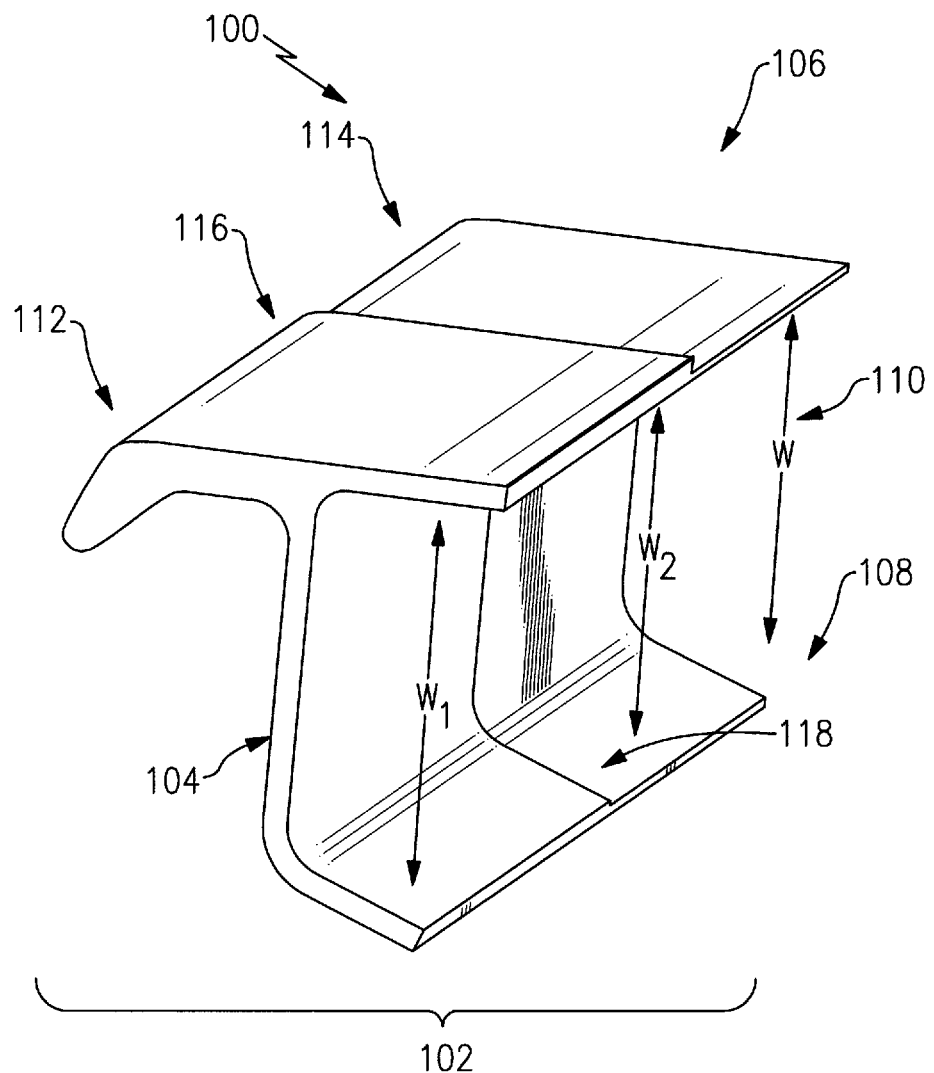
FIG. 5 is a side, perspective view of an exemplary embodiment of a repair device.

For further discussion of the concepts briefly outlined above, and with continued reference to FIGS. 3 and 4, reference can now be had to FIG. 5, in which there is depicted an exemplary embodiment of a repair device 100. The repair device 100 includes a supplemental part 102 that is configured to mount to the forward frame v-blade 30. The supplemental part 102 includes a central web 104 and a first leg 106 and a second leg 108 projecting from and spaced apart by the central web 104. This configuration forms a channel 110 with a channel width W.

The supplemental part 102 is configured with a first portion 112 and a second portion 114. Each of the first portion 112 and the second portion 114 are delineated by an outer step 116 and an inner step 118. The outer step 116 designates a first outer dimension $D_1$ for the first portion 112 and a second outer dimension $D_2$ for the second portion 114. The inner step 118 designates a change in the channel width W, as between in the present example a change from a first width $W_1$ of the first portion 112 to a second width $W_2$ of the second portion 114. In one embodiment, $D_1$ is greater than $D_2$, and more particular to the implementation of the supplemental part 102, $D_2$ is sized so that the second portion 114 fits within the v-blade channel 42. In one embodiment, $W_1$ is less than $W_2$.

The supplemental part 102 in the present example can be constructed monolithically such as by way of machining, bending, extruding, casting, and related techniques for manipulating material into appropriate shapes. These materials include aluminum, steel, magnesium, and titanium. Monolithic construction is beneficial because it may reduce the number of fasteners that are necessary to complete the repair. In one example, the supplemental part 102 can be designed so as to be machined from a single billet of aluminum. Other constructions of the repair device 100 may likewise comport with assembly techniques in which, for example, multiple pieces are assembled together to form the supplemental part 102. In this construction, fasteners such as welds, screws, bolts, and rivets may be used to secure the various pieces together as needed. For example, although not shown in FIG. 5, other features such as openings in the second portion 114 can be included, wherein such openings can permit insertion of fasteners to secure the repair device 100 to the forward frame v-blade 30. Examples of the layout and configuration of these openings are provided in connection with the other exemplary embodiments of repair devices discussed below.

Figure 6:
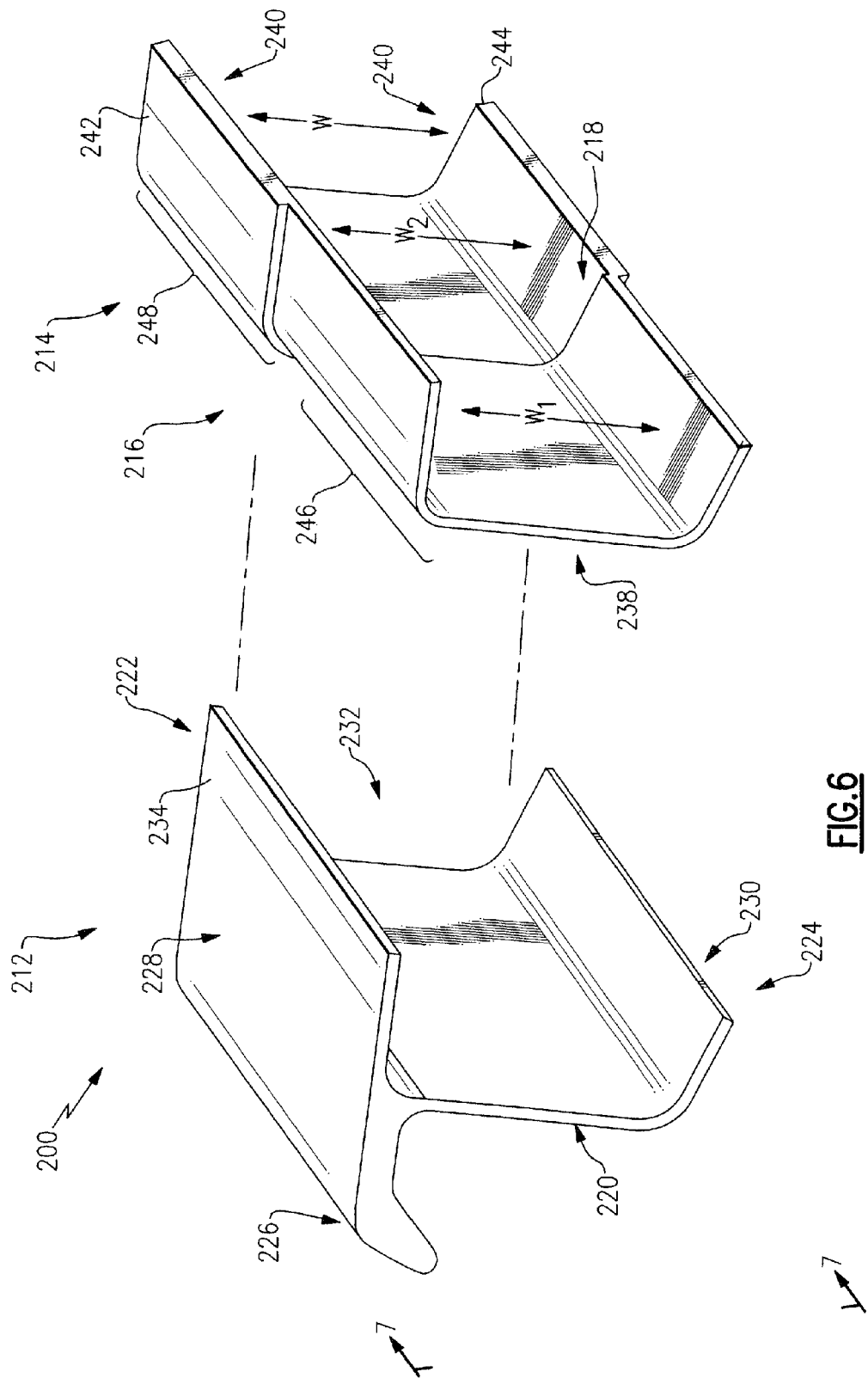
FIG. 6 is a side, perspective, exploded assembly view of another exemplary embodiment of a repair device.
Figure 7:
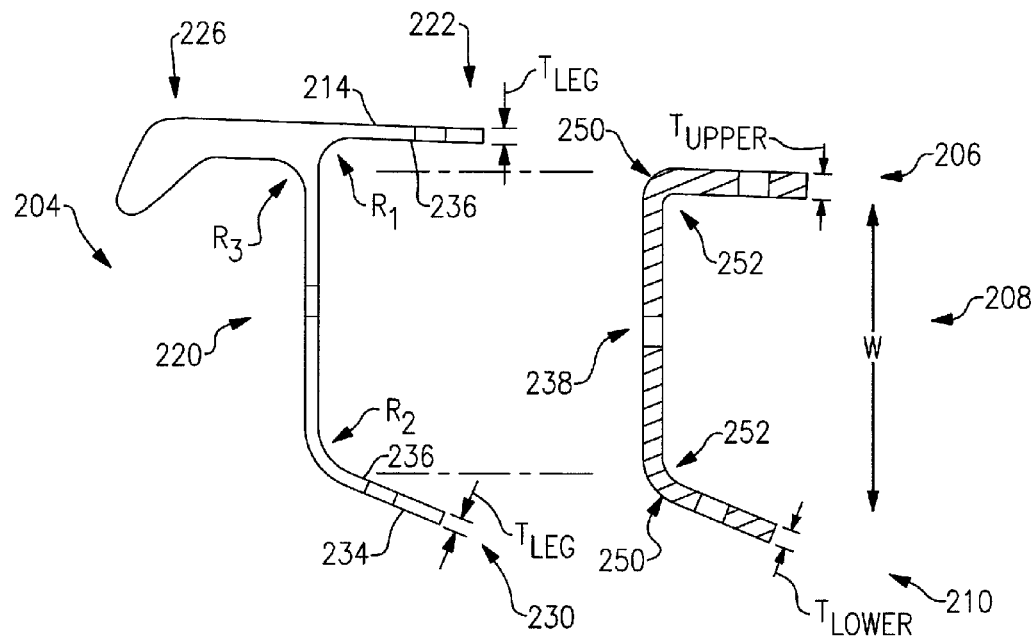
FIG. 7 is a side view of the repair device of FIG. 6.

For example, reference can now be had to FIGS. 6 and 7, in which there is illustrated another exemplary embodiment of a repair device 200. The repair device 200 is an example of the bifurcated design described above. Like numerals are used to identify like components as between the FIG. 5 and the FIGS. 6 and 7, but the numerals are increased by 100 (e.g., 100 is now 200 in FIGS. 6 and 7). In the present example, the repair device 200 includes a supplemental part 202 with a central web 204, a first leg 206, a second leg 208, and a channel 210 with a channel width W formed therein. The supplemental part 202 also includes a first portion 212 and a second portion 214, each having an outer dimension designated, respectively, by way of a first outer dimension $D_1$ and a second outer dimension $D_2$.

In one embodiment, the supplemental part 202 includes a repair part 216 and a splice plate 218. The repair part 216 is used to replace the repair section (e.g., the repair section 34 (FIG. 3)), as briefly mentioned above. The repair part 216 is configured with features similar to the v-blade channel 42. These feature include, but are not limited to, a repair web 220, an upper or first flange 222, and a lower or second flange 224 in opposing relation to the upper flange 222. The upper flange 222 includes a forward or first flange portion 226 projecting from the repair web 220 in a first direction and an upper stiffening leg 228 that projects rearwardly or in an opposite second direction away from the repair web 230. The lower flange 226 includes a lower stiffening leg 230 that also extends from the repair web 220 in about the second direction thus forming, with the upper stiffening leg 228, a channel 232 for receipt of the splice plate 218. Each of the upper stiffening leg 228 and the lower stiffening leg 230 have an outer surface 234, an inner surface 236 that forms an inner radii (e.g., inner radii $R_1$ and $R_2$, respectively) with the repair web 220, and a leg thickness $T_{LEG}$. An outer radius $R_3$ is formed opposite the inner radius $R_1$.

The splice plate 218 includes a splice web 238 and a pair of elongated members 240. The elongated members 240 include an upper or first elongated member 242 and a lower or second elongated member 244 each having, respectively, an upper member thickness $T_{UPPER}$ and a lower member thickness $T_{LOWER}$. Together the splice web 238, the upper elongated member 242, and the lower elongated member 244 form an engagement area 246 configured to fit in the channel 232 in the repair part 216 and an engagement area 248 configured to fit in the v-blade channel, e.g., the v-blade channel 44 of FIGS. 1-4. The splice plate 218 also has a pair of outer radii 250 and a pair of inner radii 252, which are formed at the interface of the splice web 238 and the elongated members 240.

As mentioned above, dimensions and construction of the repair part 216 are generally selected to permit continued operation of the forward frame v-blade 30 within the nacelle 12. To prevent further damage such as the crack formation 40, however, embodiments of the repair device 200 can be configured so that portions of the repair device 200 (e.g., the repair part 216 and/or the splice plate 218) are more resilient, stronger, or otherwise constructed with improved mechanical properties as compared to, e.g., the repair section 34. Such improvements can be effectuated by way of material selection, manufacturing techniques, as well as design criteria such as dimension selection for all and/or part of the repair part 216. In context with the concepts disclosed herein, since crack formation 40 often occurs in areas proximate the outer radius $R_3$, the inner radius $R_1$ and the outer radius $R_3$ can be larger than the corresponding radii of the v-blade cross-section 42. In one example, the inner radius $R_1$ and the outer radius $R_3$ are at least about 0.125 in larger than such corresponding radii.

Dimensions can also be determined based on structural analysis such as by way of modeling the loading on, e.g., the repair web 220. This modeling can be used to identify values for the dimensions of particular portions of the repair part 216 and/or the splice plate 218. Values for the inner radii $R_1$ and $R_2$ and the outer radius $R_3$, the leg thickness $T_{LEG}$, the upper member thickness $T_{UPPER}$ and the lower member thickness $T_{LOWER}$, as well as other dimensions for the repair part 216 and the splice plate 218 can, for example, be determined by modeling the repair web 220 as a cantilever beam and comparing the bending stress of the combination of the repair web 220 (the "repaired stress") and the splice web 238 to the bending stress of the v-blade web 50 in its unrepaired condition (the "nominal stress"). In one embodiment, the repair device 200 is configured such as by selection of dimensions so that the repaired stress does not exceed about 77% of the nominal stress. In yet another embodiment, the repair device 200 is configured so that the repaired stress is about 26% of the nominal stress.

Figure 8:
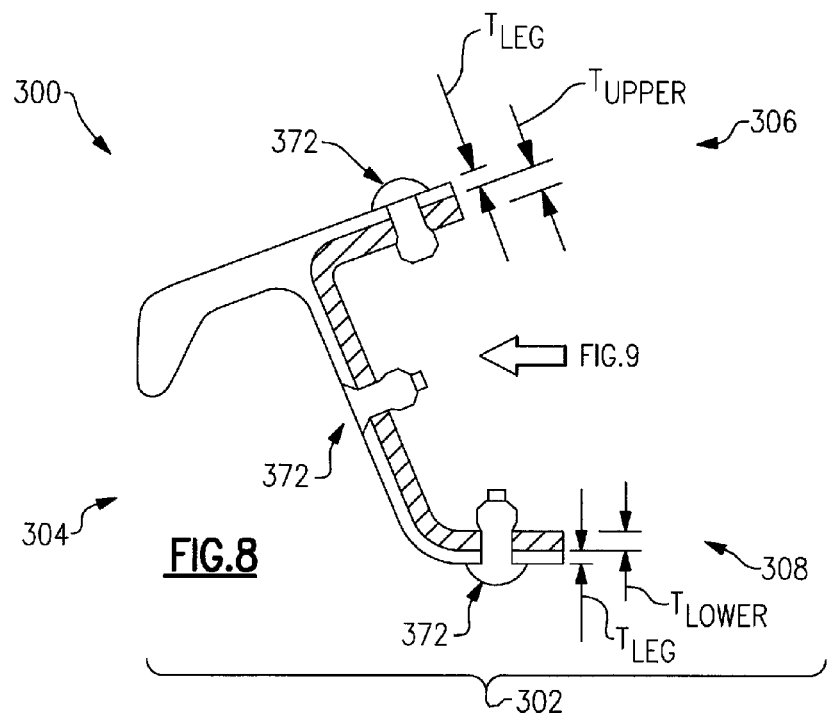
FIG. 8 is a side view of yet another exemplary embodiment of a repair device.
Figure 9:
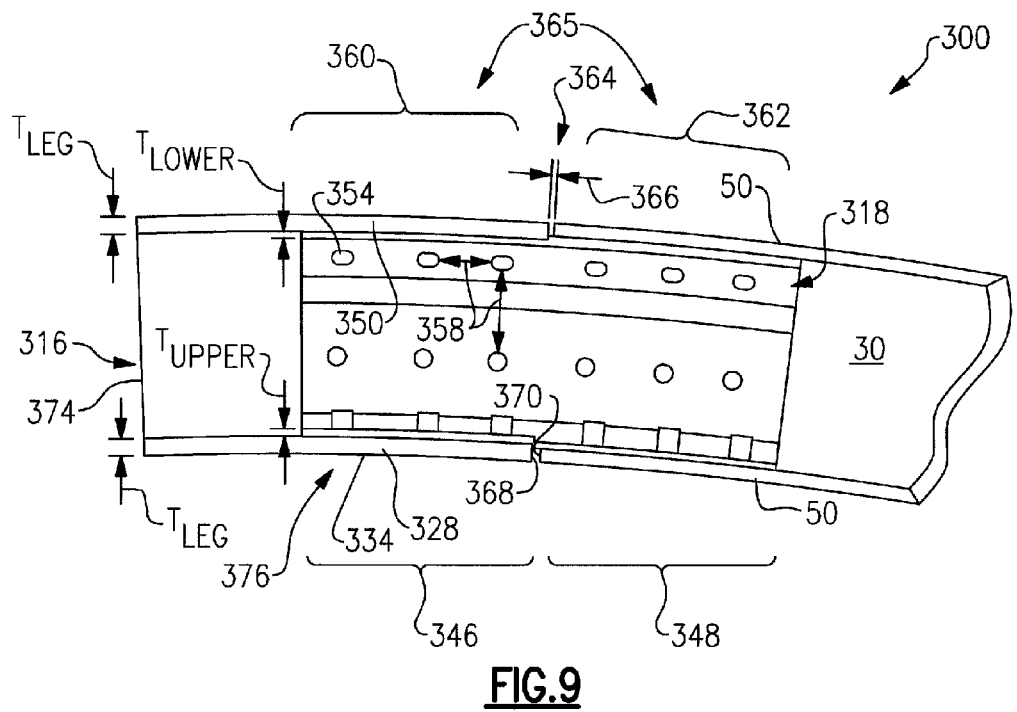
FIG. 9 is a rear view of the repair device of FIG. 8.

Turning next to FIGS. 8 and 9, there is provided another exemplary embodiment of a repair device 300, which is depicted as implemented on a forward frame v-blade 30. Like numerals are used to identify like components of the repair device 200, except that the numerals are increased by 100 (e.g., 200 is now 300 in FIGS. 7 and 8). For example, the repair device 300 includes a repair part 316 and a splice plate 318. Positive recitation of other common components and features as between the repair device 200 and the repair device 300 is not provided herein, however, unless necessary for the discussion and or clarification of the concepts related to the repair device 200 or otherwise contemplated herein.

The repair device 300 includes a plurality of openings 354 that extend through the repair part 316, the splice plate 318, and the forward frame v-blade 30. These openings 354 are arranged in arrays 356, in which the position and/or location of openings 354 defined by spacing 358 among and between the openings 354. The arrays 356 include a first array 360 and a second array 362, the latter (i.e., the second array 362) being used to couple the repair device 300 to the forward frame v-blade 30 proximate the repair section 34. This coupling can form a joint 364 with a gap 366 as between an end 368 of the repair part 316 and an exposed portion 370 of the repair section 34 on the forward frame v-blade 30. The joint 364 is secured using one or more fasteners 372 that are positioned in each of the openings 354, thus effectuating the coupling of the repair device 300 and the forward frame v-blade 30.

Fasteners for use as the fasteners 372 include rivets, screws, bolts, and other implements that are compatible with the loading and stress conditions contemplated herein. When rivets are utilized, it may be desirable to use aircraft-grade rivets, and more particularly rivets with a nominal body diameter of at least about 0.15 in. In another example, the nominal body diameter depends on or is selected in accordance with the material thickness for one or more of the repair part 316 and the splice plate 318, including the leg thickness $T_{LEG}$, the upper member thickness $T_{UPPER}$ and the lower member thickness $T_{LOWER}$. In yet another example, the rivets comprise one or more of size 5 and size 6 rivets. Moreover, the number and placement of the rivets, as defined for example by the location of the openings 354, can be selected in accordance with the modeling and analysis of the repair device 300. In one embodiment, nine (9) rivets in, e.g., a three (3) by three (3) array, is suitable for securing the repair device 200 to the forward frame v-blade 30. Likewise a similar number of rivets can be used to secure the repair part 316 to the splice plate 318.

An end 374 of the repair part 316 opposite the joint 364 can be left generally unsupported such as by extending the splice plate 318 across only a supported portion 376 of the repair part 316. The length of the portion left unsupported as measured from the unsupported end 374 is in one embodiment selected to avoid interference between the splice plate 318 and latching mechanisms that are typically used in connection with the forward frame v-blade 30 and/or the torque box 28 (FIGS. 2 and 3). Generally the length of the splice plate 318 can be based on the nominal body diameter of the fasteners (e.g., the rivets), wherein the determination of the length may be calculated as a multiple of the nominal body diameter. By way of example, and when implemented on, e.g., the repair device 200 and 300, the distance from the opening for the rivet to the end (e.g., the unsupported end 374) is about two (2) to about four (4) times the nominal body diameter and the distance from rivet to rivet is from about three (3) to twelve (12) times the nominal body diameter. In one example, the resulting length of the splice plate 318 is at least about 2.5 in. In another example, the resulting length of the splice plate is from about 3 in to about 12 in.

The size of the gap 366 can vary within, for example, accepted tolerances and other dimensioning standards as related to, e.g., manufacturing and assembly of the repair device 300 to the forward frame v-blade 30. Embodiments of the repair device 300 can be configured so that the end 368 is disposed in abutting relation (e.g., partial and/or full contact) to the exposed portion 370. In other embodiments, the end 368 is in spaced relation to the exposed portion 370 so that the gap 366 does not exceed about 0.005 in.

As depicted in FIG. 8, the outer surfaces 334 of the repair part 316 are substantially planar with the outer surface 52 of the forward frame v-blade 30. This configuration permits operation of the forward frame v-blade 30 in its repaired condition. Noted in the present example, however, is that the leg thickness of the upper stiffening leg 328 and the lower stiffening leg 330 is greater than the v-blade flange thickness of the upper v-blade flange 46 and the lower v-blade flange 48. In one example, the difference between the leg thickness and the v-blade flange thickness is at least about 0.30 in. In yet another example, the difference is determined in accordance with modeling such as the modeling discussed above.

The upper member thickness $T_{UPPER}$ and the lower member thickness $T_{LOWER}$ can likewise vary as between the upper elongated member 342 and a lower elongated member 344. Such variations can be commensurate with the selected thicknesses and related dimensions for the repair part 316 and/or the splice plate 318. In one embodiment, the upper member thickness $T_{UPPER}$ is greater than the lower member thickness $T_{LOWER}$. Moreover, the first dimension D1 and the second dimension D2, which delineate the engagement area 346 from the engagement area 348, is selected to maintain the planarity of the outer surfaces 334 of the repair part 316 and the forward frame v-blade 30, but to accommodate for the increased leg thickness of the upper stiffening leg 328 and the lower stiffening leg 330.

Figure 10:
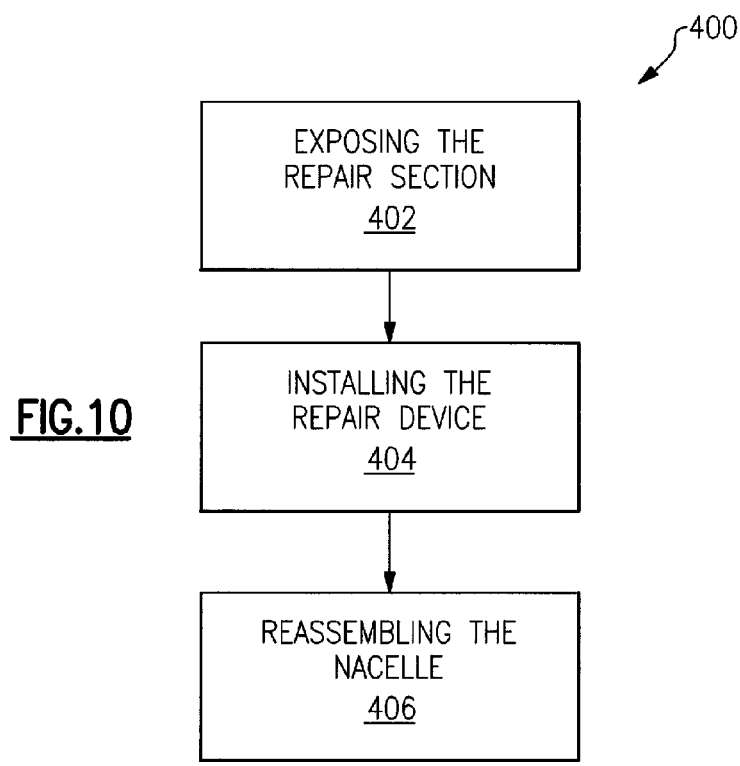
FIG. 10 is a flow diagram of an exemplary embodiment of a method for repair a forward frame v-blade using a repair device such as the repair device of FIGS. 5-8.
Figure 11:
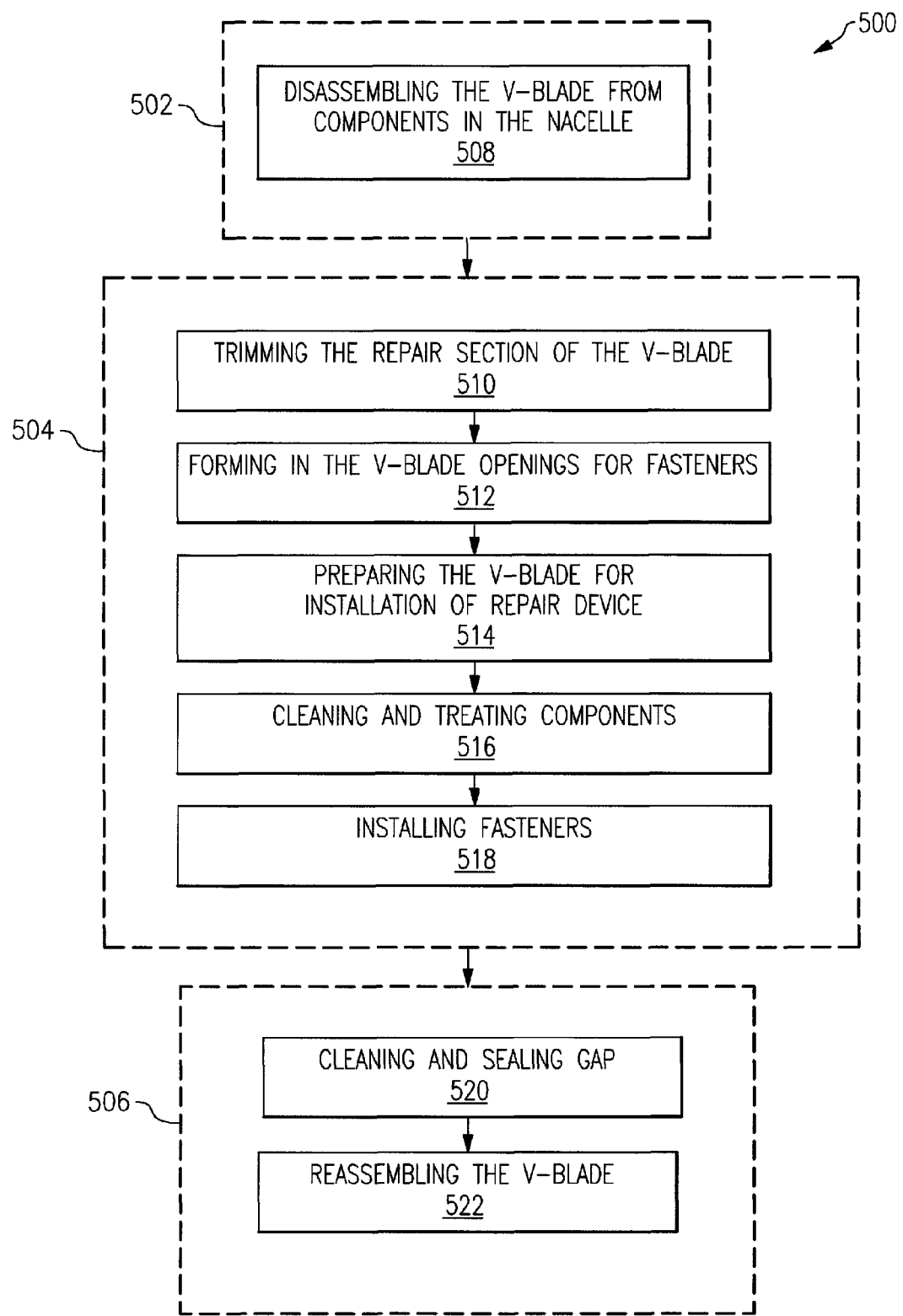
FIG. 11 is a flow diagram of another exemplary embodiment of a method for repair of a forward frame v-blade using a repair device such as the repair device of FIGS. 5-8.

The repair device 100 (FIG. 5), 200 (FIGS. 6 and 7), and 300 (FIGS. 8 and 9) are configured for implementation in a method for repairing and/or refurbishing the forward frame v-blade 30 within the nacelle 12 (FIG. 1). Exemplary embodiments of such method, as outlined in the blocks of methods 400 and 500 depicted in FIGS. 10 and 11 are discussed in more detail below. While reference may be made to particular pieces and components, e.g., the repair device 300, the steps and processes that are provided are equally applicable to other embodiments, configurations, and implementations of the concepts presented in the present disclosure.

Referring first to FIG. 10, and generally to FIGS. 1-4, 8, and 9, the method 400 includes, at block 402, exposing the repair section 34 of the forward frame v-blade 30, at block 404, installing the repair device 300, and at block 406, reassembling the nacelle 12. The method 400 takes advantage of the various features of repair devices such as the repair device 300 because the process of repairing, e.g., the engine of an aircraft, does not require extensive dismantling of the components in the nacelle 12. Rather the method 400 can be utilized as an alternative to replacing the forward frame v-blade 30 in its entirety from the nacelle 12 to fix the damage. Whereas such replacement results in the expenditure of labor and money to tear down the aircraft engine, as well as lost revenue due to the inactivity of the aircraft, implementation of the method 400 to install the repair device 300 can be completed in less than about 5% of the time of conventional replacement.

Expanding on the general concepts of the method 400, and with reference now to FIG. 11, it is seen that the method 500 includes a variety of steps for repairing the forward frame v-blade 30 in the nacelle 12. Similar to the method 400 discussed above, the method 500 also includes at block 502, exposing the repair section 34 of the forward frame v-blade 30, at block 504, installing the repair device 300, and at block 506, reassembling the nacelle 12. In the present example, the method 500 also includes, at block 508, disassembling the forward frame v-blade 30 from components in the nacelle 12 including the torque box 28, at block 510, trimming the repair section 34 of the forward frame v-blade 30 and, at block 512, forming in the forward frame v-blade 30 openings (e.g., openings 354) for fasteners 372. The method 500 also includes, at block 514, preparing the forward frame v-blade 30 for installation of the repair device 300, which can include, at block 516, cleaning and treating components including the repair part 316, the splice plate 318, and the exposed portion 370 of the forward frame v-blade 30. The method 500 further includes, at block 518, installing the fasteners 372 through the splice plate 318 into the forward frame v-blade 30, at block 520, cleaning and sealing the gap 366, and at block 522, reassembling the forward frame v-blade 30 such as by reassembling the torque box 28 and related components.

In one embodiment, the method 500 can be utilized to repair one or more of the twelve-o'clock repair section 36 and the six-o'clock repair section 38 of the forward frame v-blade 30, both of which are readily susceptible to damage. For purposes of the present example, trimming of the repair section (e.g., the twelve-o'clock repair section 36 and the six-o'clock repair section 38) can remove at least about 6 in, and in one example at least about 6.25 in, of the repair section 34. This trimming removes sufficient material so as to permit placement of the repair device 200.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values may include the actual value that is expressly stated, as well as other values that are, or may be, the decimal, fractional, or other multiple of the actual value indicated, and/or described in the disclosure.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A repair device for a v-blade in a gas turbine engine on an aircraft, said repair device comprising:

a supplemental part comprising a central web and a first leg and a second leg projecting from and spaced apart by the central web to form a channel;

wherein the supplemental part has a first portion and a second portion with an outer dimension that is greater than the outer dimension of the first portion;

wherein the channel is wider in the first portion of the supplemental part than in the second portion of the supplemental part;

wherein the first portion has a first array of openings therethrough; and wherein the second portion of the supplemental part has a second array of openings therethrough, and wherein a number of openings in the first array of openings is equal to a number of openings in the second array of openings.

2. The repair device according to claim 1 wherein the first leg is thicker than the second leg in the first portion.

3. The repair device according to claim 1 wherein the supplemental part comprises a plurality of pieces including a repair part, a splice plate, and fasteners securing the repair part to the splice plate.

4. The repair device according to claim 3 wherein the splice plate only supports a portion of the repair part.

5. The repair device according to claim 3, wherein the fasteners have a nominal body diameter, and wherein the fasteners are separated by a distance that is from about three to about twelve times the nominal body diameter.

6. The repair device according to claim 5 wherein the fasteners comprise aircraft-grade rivets, and wherein the nominal body diameter is at least about 0.15 in.

7. The repair device according to claim 1 wherein the first leg and the second leg are thicker in the first portion than the second portion.

* * * * *